3,228,922
POLYMERIZATION PROCESS USING A CATALYST SYSTEM COMPRISING AN ORGANO-ALUMINUM COMPOUND, AN ALCOHOL AND OXYGEN
Aristotle G. Prapas, Edison, N.J., assignor to W. R. Grace & Co., a corporation of Connecticut
No Drawing. Filed Aug. 13, 1962, Ser. No. 216,298
The portion of the term of the patent subsequent to Dec. 18, 1979, has been disclaimed
7 Claims. (Cl. 260—89.5)

This application is a continuation-in-part of a copending application U.S. Serial No. 68,341, filed November 10, 1960, now Patent No. 3,069,403 which in turn was a continuation-in-part of an application having U.S. Serial No. 7,106, filed February 2, 1960, now abandoned.

This invention relates a novel polymerization process. More particularly, it is directed to the polymerization of esters of acrylic acid.

Summarily this invention is concerned with polymerizing esters of acrylic acid by subjecting said esters to the action of a catalyst consisting essentially of an aluminum alkyl compound and an alcohol, said alcohol containing at least 0.004 cc. oxygen/cc. alcohol.

In this invention operable esters of acrylic acid include, but are not limited to, methyl acrylate, ethyl acrylate, ethylene glycol diacrylate, n-butyl acrylate, isobutyl acrylate, tert-butyl acrylate, 2-ethylhexyl acrylate, tridecyl acrylate and the like.

The preferred alcohols employed in this invention are alkenols in which the unsaturation is more than two carbon atoms removed from the hydroxyl group and alkanols having the general formula: $C_nH_m(OH)_x$ wherein $n$ is an integer from 1 to 24 inclusive, $m$ is equal to $2n+2-x$ and $x$ is an integer from 1 to 3 inclusive. Examples of operable catalytic alkenols in the instant invention include oleyl alcohol, ω-undecylenyl alcohol, 4-hexen-1-ol, 1-penten-5-ol, 4-octen-1-ol and 3-buten-1-ol. Examples of the alkanols employable as the alcohol catalyst component in this invention include methanol, ethanol, 1-propanol, 2-propanol, 1-butanol, isobutyl alcohol, 2-butanol, tert-butyl alcohol, amyl alcohol, isoamyl alcohol, tert-amyl alcohol, sec-amyl alcohol, n-hexyl alcohol, n-heptyl alcohol, n-octyl alcohol, n-nonyl alcohol, n-decyl alcohol, n-undecyl alcohol, lauryl alcohol, myristyl alcohol, and the like.

The use of aluminum alkyls in recent years for polymerizing olefin monomers is well known in the art. See U.S. 2,699,457 to Zeigler et al. The effectiveness of aluminum alkyls and an alcohol as a catalyst to polymerize the aforementioned esters is surprising in view of the fact that oxygen-containing impurities, e.g., moisture, air and carbon dioxide, are well-known poisons for aluminum alkyls in the polymerization of ethylene and propylene. (See, for example, U.S. 2,781,410 to Zeigler et al.) Moreover, it is remarkable that a catalyst formed by the addition of an oxygen-containing alcohol to an aluminum alkyl compound will polymerize the monomers of the instant invention in view of the fact that polymerization of monomers such as vinyl acetate has not been accomplished with the aid of Ziegler catalysts. See Linear and Stereoregular Addition Polymers, Gaylord and Mark, p. 298, Interscience Publishers, 1959. In addition, it is even more surprising that not only does the oxygen-containing alcohol fail to have a poisonous effect on the aluminum alkyl compound in the polymerization of the aforesaid esters, but instead has a synergistic effect when combined with the aluminum alkyl compound resulting in an increased polymer yield over and above the yield obtained when the catalyst is oxygen and an aluminum alkyl compound as will be shown hereinafter.

The reason for the synergistic effect of the catalyst components is not known. From the results it appears preferable to mix the catalyst components in the presence of the monomer. Premixing the catalyst prior to addition to the monomer to be polymerized results in lower yields; however, such yields are still greater than those obtained when the aluminum alkyl compound is used as the catalyst per se. In addition, results indicate that the catalyst components should preferably be added to the monomer at low temperatures in order to obtain optimum polymer yields. For any given polymerization reaction temperature an initially lower temperature for the catalyst addition step will result in higher polymer yields in comparison to the catalyst addition and the polymerization reaction being performed at the same temperature. Preferably, the catalyst addition step is carried out at a temperature below minus 20° C.; the lower limit being the freezing point of the solution to be polymerized. However, all steps of the invention are operable under ambient conditions, thus the catalyst addition step and the polymerization step can be performed at, e.g., room temperature, if desired, without affecting operability. The temperature of the polymerization step at atmospheric pressure is limited by the component having the lowest boiling point. Obviously, higher temperatures can be used if superatmospheric pressure is employed. The polymerization step is ordinarily performed at a temperature in the range of minus 25 to 40° C. or more at atmospheric pressure. The preferred method is to start at the lower temperature limit and let the mixture warm up to the upper limit.

The mole ratio of the catalyst components is not critical. An aluminum alkyl compound: alcohol mole ratio of 1:0.1 to 10 is operable, preferably 1:1 is employed.

Although the polymerization is operable in the presence of a solvent, the polymerization is preferably carried out in the absence of a solvent. If a solvent is used in the practice of this invention it should be one which is inert and does not interact with either the monomer to be polymerized, the catalyst employed, or the growing polymer chain. The preferred inert liquid solvents are dry aliphatic hydrocarbon solvents in the alkane and cycloalkane groups. Examples of the preferred solvents include n-pentane, n-hexane, n-heptane, n-octane, n-nonane, and cyclohexane. However, aromatic hydrocarbons, e.g., benzene, toluene, and chlorobenzene, are operable as solvents in this invention.

The following examples are set forth to illustrate but not to limit the scope of this invention.

*Example 1*

To a 12 oz. Pyrex polymerization bottle filled with dry nitrogen were added 8.947 g. commercially available butyl acrylate and 0.47 cc. of commercially available isobutyl alcohol containing at least 0.004 cc. oxygen/cc. alcohol. The bottle was capped with a puncturable neoprene rubber disc and a metal cap containing a hole in the center thereof large enough to admit a syringe needle. After capping, the bottle was chilled to minus 60° C. and a syringe with a needle long enough to reach the bottom of the bottle was used to introduce 2.0 cc. of a solution of commercial grade diisobutyl aluminum hydride (5.6 millimoles) in heptane through the metal cap and puncturable rubber disc. The bottle was immediately placed in a Dry Ice-isopropanol bath (minus 20° C.) in a light-proof vibrating container, wherein it was mechanically shaken for 4 hours. At the end of this period, the Dry Ice bath was removed from the container and the container was mechanically shaken for an additional 1 hour while warming up to room temperature of 26° C. The container was then opened and the contents of the bottle were worked up in the following manner.

The contents of the bottle were poured into 250 ml. of a 5% aqueous solution of hydrochloric acid. The thus-precipitated polybutyl acrylate product was collected and washed with methanol. The product was then dried at 60° C. and 30 mm. pressure overnight. The dried polymer weighed 3.708 grams representing a 41.44% conversion of the butyl acrylate monomer reactant.

*Example 2*

The reaction and work up were run as in Example 1 except that 2.0 cc. of a solution of commercial grade triisobutyl aluminum (5.6 millimoles) in heptane were substituted for the 2.0 cc. of the heptane solution containing the 5.6 millimoles of disobutyl aluminum hydride. A percent conversion of about 30% of the butyl acrylate reactant to polybutyl acrylate product was obtained.

*Example 3*

The reaction and work up were as in Example 1 except that 2.0 cc. of a solution of commercial grade diisobutyl aluminum chloride (5.6 millimoles) in heptane were substituted for the 2.0 cc. of heptane solution containing the 5.6 millimoles of diisobutyl aluminum hydride. A 39% conversion of the butyl acrylate monomer reactant to polybutyl acrylate was obtained.

The following examples in Table I show the operability of the present invention with various monomers and various commercially available alcohol catalysts containing at least 0.004 cc. oxygen/cc. alcohol. The reaction procedure and work were as in Example 1.

brating container, wherein it was mechanically shaken for 4 hours at room temperature (26° C.). The contents of the bottle were poured into 250 ml. of a 5% aqueous solution of hydrochloric acid to precipitate the polybutyl acrylate polymer product. The polymer product was washed with methanol and dried overnight at 60° C. and 30 mm. pressure. The dried polymer weighed 4.161 g. representing a 37.2% conversion of the butyl acrylate reactant.

Example 9 evidences the fact that the amount of oxygen used as a catalyst is not critical as long as at least the amount present in commercial alcohol, i.e., 0.0004–0.4 cc. oxygen/cc. alcohol is present in the catalyst system. As shown in Example 9 even a tremendous excess of oxygen is operable.

Copolymers of the ester monomers polymerizable by the instant invention can be obtained by subjecting the monomers in the presence of each other to the action of the catalyst disclosed herein. Thus, for example, a butyl acrylate-ethyl acrylate copolymer is produced in the presence of a catalyst comprising an aluminum alkyl compound and an alcohol of the present invention.

Instead of oxygen, air may be added to the catalyst system to perform this invention. However, since the $O_2$ content of air is low, a proportionately larger volume of air must be used to insure that at least 0.004 cc. oxygen/cc. alcohol is present.

The aluminum alkyl compounds which are operable as part of the catalyst in the instant invention contain alkyl groups having 1 to 8 carbon atoms. Examples of pre-

TABLE I

| Example No. | 4 | 5 | 6 | 7 | 8 |
| --- | --- | --- | --- | --- | --- |
| Acrylate monomer | Ethyl | 2-ethyl-hexyl | Tridecyl | Methyl | Butyl. |
| Monomer weight, gms | 9.246 | 8.869 | 8.824 | 8.90 | 8.947. |
| Heptane solution containing 5.6 millimoles diisobutyl aluminum hydride/2.0 cc. solution, cc. | 2.0 | 2.0 | 2.0 | 2.0 | 2.0. |
| Alcohol, type | t-Amyl | Methyl | Methyl | Isopropyl | Oleyl. |
| Alcohol, cc | 0.54 | 0.2 | 0.2 | 0.38 | 1.50. |
| Catalyst addition temp., ° C | −60 | −60 | −60 | −60 | −60. |
| Polymerization temp., ° C.[1] | −20 | −20 | −20 | −20 | −20. |
| Dry polymer, gms | 3.375 | 4.116 | 5.007 | 2.650 | 2.94. |
| Percent conversion | 31.2 | 36.4 | 44.1 | 29.8 | 33.1. |

[1] At −20° C. for 4 hours followed by warming to room temperature (26° C.) during 1 hour period.

The alcohols used herein in the practice of this invention whether or not commercially available, require at least 0.004 cc. oxygen/cc. alcohol dissolved therein to be operative. If at least this amount of oxygen is not dissolved therein it must be added. Inherently, the commercially available alcohols used herein ordinarily contain 0.0004–0.04 cc. oxygen/cc. alcohol. However, it is possible to use a deoxygenated alcohol in practicing this invention if at least the necessary oxygen is added separately to the catalyst system.

Additionally it is possible to use a large excess of oxygen in the catalyst system without effecting the operability of the catalyst system as shown in the following example.

*Example 9*

To a 12 oz. Pyrex polymerization bottle filled with dry nitrogen were added 8.947 g. commercially available butyl acrylate and 0.23 cc. of commercially available methanol containing at least 0.004 cc. oxygen/cc. alcohol. The bottle was capped with a puncturable neoprene rubber disc and a metal cap with a hole in the center thereof large enough to admit a syringe needle. After capping, the bottle was chilled to minus 60° C. and a syringe was employed to introduce 2.0 cc. of a heptane solution containing 5.6 millimoles of diisobutyl aluminum hydride through the puncturable rubber disc. A second syringe was then used to add 134 cc. of oxygen to the contents of the bottle. The bottle was removed from its chilling bath and placed in a light-proof vibrating container, wherein it was mechanically shaken for 4 hours at room ferred aluminum trialkyls include trimethyl, triethyl, tripropyl, triisopropyl, tributyl, triamyl, triisoamyl, trihexyl, triisohexyl, triheptyl, and trioctyl aluminum. Other preferred aluminum alkyl compounds operable in this invention include dialkyl aluminum chloride, alkyl aluminum dichloride and dialkyl aluminum hydride. Thus the preferred aluminum alkyl compounds having the formula

wherein R is an alkyl, hydrogen or chloride, R' is an alkyl or chloride and R'' is an alkyl, all of said alkyls containing 1 to 8 carbon atoms.

To show the synergistic effect of the alcohol on the catalyst system, the following runs were performed.

*Example 10*

8.947 g. of commercially available butyl acrylate were added to a 12 oz. Pyrex polymerization bottle filled with dry nitrogen. The bottle was capped as in Example 9. After capping, the bottle was chilled to minus 60° C. and a syringe was used to add 2.0 cc. of a heptane solution containing 5.6 millimoles of diisobutyl aluminum hydride through the puncturable rubber disc. A second syringe was then used to introduce 134 cc. of oxygen into the bottle. The bottle was removed from its chilling bath and placed in a light-proof vibrating container, wherein it was mechanically shaken for 4 hours at room temperature (26° C.). The contents of the bottle were worked up as in Example 9. The dried polybutyl acrylate product weighed 3.63 g. representing a 32.5% conversion of the monomer reacted.

*Example 11*

The procedure and reactants of Example 10 were employed except that 0.058 cc. of commercially available methanol was also added to the polymerization bottle following the addition of the butyl acrylate reactant. The dried polybutyl acrylate product weighed 4.61 g. representing a 41.2% conversion of the monomer.

A comparison of Examples 10 and 11 shows that the addition of alcohol to the catalyst system increased the conversion of monomer to polymer by 25%.

The following example shows the operability of the instant invention in the presence of a solvent.

*Example 12*

The reaction was run as in Example 1 except that 10 ml. dry n-heptane was added to the polymerization bottle. After working up the product by the procedure of Example 1, the weight of the dried polybutyl acrylate was 2.82 grams equal to a 31.5% conversion of butyl acrylate monomer.

The polymerization products of this invention can be used in the same manner as the same products well known in the prior art. Such uses include surface coating, film, foams, etc.

I claim:
1. The process of polymerizing esters of unsubstituted acrylic acid wherein the alcohol moiety contains 1–13 carbon atoms which comprises subjecting said esters to the action of a catalyst consisting essentially of an aluminum alkyl compound having the formula:

wherein R is selected from the group consisting of an alkyl, hydrogen and —Cl, R' is selected from the group consisting of an alkyl and Cl and R" is an alkyl, all of said alkyls having 1 to 8 carbon atoms, and an alcohol which is a member of the group consisting of alkenols in which the unsaturation is more than two carbon atoms removed from the hydroxyl group, and alkanols having the formula: $C_nH_m(OH)_x$ wherein $n$ is an integer from 1 to 24 inclusive, $m$ is equal to $2n+2-x$ and $x$ is an integer from 1 to 3 inclusive, said alcohol containing at least 0.004 cc. oxygen/cc. alcohol said aluminum alkyl compound:alcohol mole ratio being in the range of 1:0.1 to 10.

2. The process according to claim 1 wherein the polymerization is carried out in the presence of an inert hydrocarbon solvent.

3. The process according to claim 2 wherein the inert hydrocarbon solvent is an aliphatic member selected from the group consisting of alkanes and cycloalkanes.

4. The process according to claim 6 wherein the alkane is a member of the group consisting of n-pentane, n-hexane, n-heptane, n-octane and n-nonane.

5. The process according to claim 3 wherein the cycloalkane is cyclohexane.

6. The process according to claim 1 wherein the alkanol is a member of the group consisting of methanol, t-butyl alcohol, t-amyl alcohol, iso-propyl alcohol, iso-amyl alcohol, 2-octanol and 1-octadecanol.

7. The process of polymerizing butyl acrylate which comprises subjecting butyl acrylate to the action of a catalyst consisting essentially of an aluminum alkyl compound having the formula:

wherein R is selected from the group consisting of an alkyl, hydrogen and Cl, R' is selected from the group consisting of an alkyl and Cl, and R" is an alkyl, all of said alkyls having 1 to 8 carbon atoms, and an alcohol which is a member of the group consisting of alkenols in which the unsaturation is more than two carbon atoms removed from the hydroxyl group and alkanols having the formula $C_nH_{m'}(OH)_x$ wherein $n$ is an integer from 1 to 24 inclusive, $m$ is equal to $2n+2-x$ and $x$ is an integer from 1 to 3 inclusive, said alcohol containing at least 0.004 cc. oxygen/cc. alcohol said aluminum alkyl compound:alcohol mole ratio being in the range of 1:0.1 to 10.

References Cited by the Examiner

UNITED STATES PATENTS

| | | | |
|---|---|---|---|
| 2,129,664 | 9/1938 | Barrett et al. | 260—63 |
| 2,699,457 | 1/1955 | Ziegler et al. | 260—683.15 |
| 2,868,771 | 1/1959 | Ray et al. | 260—93.5 |
| 3,069,403 | 12/1962 | Prapas | 260—89.1 |

JOSEPH L. SCHOFER, *Primary Examiner.*

JOSEPH R. LIBERMAN, *Examiner.*